United States Patent
Scheffler-Hudlet et al.

[11] Patent Number: 6,030,911
[45] Date of Patent: Feb. 29, 2000

[54] GREEN THERMO-ABSORBENT GLASS

[75] Inventors: Herbert Scheffler-Hudlet; Roberto Cabrera-Llanos, both of Estado de México; Rafael Pinto-Negroe, México, all of Mexico

[73] Assignee: Vitro Flotado, S.A. de C.V., Villa de Garcia, Mexico

[21] Appl. No.: 09/162,397

[22] Filed: Sep. 28, 1998

Related U.S. Application Data

[63] Continuation-in-part of application No. 08/671,608, Jun. 28, 1996, abandoned, which is a continuation-in-part of application No. 08/505,070, Jul. 21, 1995, abandoned.

[30] Foreign Application Priority Data

Jul. 22, 1994 [MX] Mexico ..................................... 945598

[51] Int. Cl.[7] .................................................. C03C 3/087
[52] U.S. Cl. ............................................. 501/71; 501/905
[58] Field of Search ................................. 501/70, 71, 905

[56] References Cited

U.S. PATENT DOCUMENTS

| | | | |
|---|---|---|---|
| 4,701,425 | 10/1987 | Baker et al. | 501/70 |
| 4,792,536 | 12/1988 | Pecoraro et al. | 501/70 |
| 5,077,133 | 12/1991 | Cheng | 501/64 |
| 5,112,778 | 5/1992 | Cheng et al. | 501/31 |
| 5,214,008 | 5/1993 | Beckwith et al. | 501/69 |
| 5,240,886 | 8/1993 | Gulotta et al. | 501/70 |
| 5,308,805 | 5/1994 | Baker et al. | 501/71 |
| 5,318,931 | 6/1994 | Nakaguchi et al. | 501/64 |
| 5,320,986 | 6/1994 | Taniguchi et al. | 501/70 |
| 5,362,689 | 11/1994 | Morimoto et al. | 501/70 |
| 5,364,820 | 11/1994 | Morimoto et al. | 501/71 |
| 5,385,872 | 1/1995 | Gulotta et al. | 501/71 |
| 5,478,783 | 12/1995 | Higby et al. | 501/27 |
| 5,545,596 | 8/1996 | Alvarez Casariego et al. | 501/71 |
| 5,558,942 | 9/1996 | Itoh et al. | 428/426 |
| 5,582,455 | 12/1996 | Casariego et al. | 501/71 |
| 5,700,579 | 12/1997 | Jeanvoine et al. | 501/70 |
| 5,817,587 | 10/1998 | Jeanvoine et al. | 501/70 |
| 5,830,814 | 11/1998 | Combes | 501/70 |

*Primary Examiner*—Karl Group
*Attorney, Agent, or Firm*—Abelman, Frayne & Schwab

[57] ABSTRACT

A Green thermo-absorbent glass which includes a basic composition of lime glass, which consists essentially, by weight, of: 0.86 to 0.91% of total iron expressed as $Fe_2O_3$; 23.5 to 26% of $Fe^{-2}$ and 0.202 to 0.237% of FeO, expressed as $Fe_2O_3$; a critical amount of 0.15 to 0.18% of $SO_3$ which does not affects the refining properties and ability of the $SO_3$ to eliminate bubbles, and in the absence of $CeO_2$; the green glass having a visible light transmission greater than 70%, an ultra-violet radiation transmission greater than 38% and less than 40%, an infra-red radiation transmission greater than 21% and less than 26.5%. and a total solar transmission greater than 41 and less than 47%, without affecting the refining properties and ability of the $SO_3$ to eliminate bubbles.

3 Claims, No Drawings

GREEN THERMO-ABSORBENT GLASS

This is a CIP of U.S. application Ser. No. 08/671,608, filed Jun. 28, 1996, now abandoned, which is a CIP of U.S. application Ser. No. 08/505,070, filed Jul. 21, 1995, now abandoned.

BACKGROUND OF THE INVENTION

The well-known formulations of lime glass, which comprise a mixture of sodium oxide ($Na_2O$), lime (CaO) and silica ($SiO_2$), known also as "soda-lime-silica glass", for the production of "flat glass" for architectural use and, mainly, for use in the automotive industry.

For automotive use it is highly desirable that the glass have a high level or percentage of visible light transmission, in order to provide the driver a good visibility of his surroundings, thus complying with the norms of automotive safety.

Similarly, it is highly desirable that the glass have the necessary absorption properties to absorb damaging infrared (IR) and ultra-violet (UV) solar light, so as to control the accumulation of heat in the interior of vehicles, which will result in a reduction in power consumption needed for the automotive air conditioning equipment and for the vehicles themselves.

It is well-known that the transmitting characteristics of the glass of different wavelengths can be controlled by adding several coloring agents in the initial manufacturing mix.

Consequently, for automotive applications, it has been desirable to use colorants to produce a glass that is able to filter a large portion of the damaging ultra-violet rays from the sun, lower than 39% (measured in the wavelength of $\lambda$ 300–400 nm), but that permits the largest possible visible amount (of the luminous rays) up to 70% or more.

Iron is generally present in the glass as a ferric oxide, imparting to the glass a clear green color. The spite that, within the glass composition, the total amount of iron present is found to comprise both ferric oxide ($Fe_2O_3$) and as ferrous oxide (FeO) since, even when pure ferric oxide is used in the basic raw materials during the glass forming process, a portion of the ferric oxide is reduced and is transformed into ferrous oxide.

Normally, the total quantity of iron in the glass and its amount of ferrous oxides are expressed as being based on $Fe_2O_3$. It is also standard in this industry to express the quantity of ferrous or ferric oxide as a percentage of the total iron, namely:

$$\% \ Fe^{+2} \ (FERROUS) = \frac{FeO \times 100}{Total \ Fe_2O_3}$$

$$\% \ Fe^{+3} \ (FERRIC) = \frac{Fe_2O_3 \times 100}{Total \ Fe_2O_3}$$

The iron oxides (ferric and ferrous) impart different optical properties to the glass, the total quantity of iron present and its equilibrium as ferric or ferrous have a direct impact on the color, light transmission and absorption of infra-red and ultra-violet radiation.

The ferric oxide absorbs ultra-violet energy (low transmission level), and at the same time it has a high level of light transmission, and of infra-red energy transmission and it possesses a tenuous yellow-yellow greenish color.

By contrast, ferrous oxide absorbers infrared energy (low transmission level), has a high level of ultra-violet transmission, and a lower level of light transmission and possesses a more intense blue color.

Therefore, the greater the quantity of $Fe_2O_3$ present in the glass, the greater will be the absorption of ultra-violet radiation, and the light transmission is increased but, as the contents of FeO is increased as a result of the chemical reduction of $Fe_2O_3$, the absorption of the infra-red radiation will increase, but the absorption of the ultra-violet radiation is decreased and the light transmission is also (undesirable) decreased.

On the other hand, the greater the concentration of FeO in relation to $Fe_2O_3$, results in a change in the color of the glass, from a yellow color to a yellow-greenish or dark green (undesirable) color, which reduces the light transmission hability of the glass.

Therefore, in order to manufacture a glass with determined properties and color, one must have the correct proportion of $Fe_2O_3$ and FeO, taking into account that what is increased on the ferrous side, will diminish on the ferric one, and consequently one must arrive at a compromise of properties since improving (lowering) the value of one property will worsen (rise) the value of the other properties.

In order to increase the absorption of the infra-red and ultra-violet radiation without sacrificing the transmission of the visible spectrum, it has been necessary to lower the total content of the iron which is highly reduced from ferric to ferrous, to less than 0.70% of total iron expressed as $Fe_2O_3$.

Depending on the state of reduction of the glass, the coloring changes as follows:

---

LOW FERROUS (12%) → YELLOW → HIGH LIGHT
TRANSMISSION (HIGH FERRIC)
    YELLOW-GREEN
    GREEN-YELLOW
    GREEN (DESIRABLE)
    GREEN-BLUE
    BLUE-GREEN
    BLUE
HIGH FERROUS (75%) → AMBER → LOW LIGHT TRANSMISSION (LOW FERRIC)

---

Additionally, it is known that the oxides of titanium, molybdenum and the cerium, principally of cerium, also are colorants, and when they are used in combination with the $Fe_2O_3$, it is possible to obtain an additional reduction of the ultra-violet light transmission to a point where the sought for visibility transmission is achieved. It does, however, suffer from the disadvantage of its high cost, which makes the formulation very expensive, and has a tendency to oxidize the iron to $Fe_2O_3$.

In addition, while the use of $CeO_2$ in quantities from 0.1 to 0.5%, provides absorption of ultra-violet radiation, it has the disadvantage that it tends to change the most desirable green color, to an unacceptable yellowish hue.

In order to control the reduction of the glass formulation, metallic tin, stannic chloride, and mainly coal, have been employed as reducing agents, introduced them in the charge. Coal is used in a finely divided state in an amount of 0.01 to 0.05%, preferably 0.025% of the total amount of the charge.

In order to maintain a constant ferrous value and conserve the green color of the glass, the amount of coal required to counter the oxidizing effect provoked by the introduction of 1% cerium oxide in a typical glass with a low content of iron, is within the range of 0.9 kilograms per ton of glass.

Pursuant to the opinion of some researchers in the field, this level of coal interferes with the humidification action of the silica of the saline cake and, therefore, it results in the formation of silica slag in the smelting furnace.

Similarly, in order to maintain the ferrous value constant, thus counteracting the oxidizing effect, of a constant amount of cerium oxide is added as the content of iron in the glass increases. For example, up to 0.80% of total iron added, it was foreseen that the same amount of coal should be added due to the fact that the level of cerium oxide is constant, or that the requirement of coal should be much greater due to the fact that the equilibrium of the ferrous value would lessen with the greater addition of iron.

U.S. Pat. No. 5,077,133 to Cheng, claims a glass having a final composition that includes 0.51% to 0.96% of $Fe_2O_3$, 0.15% to 0.33% of FeO and 0.2% to 1.4% of $CeO_2$, wherein the percentage by weight of FeO, represents a percentage reduction of the total iron, expressed as $Fe_2O_3$, from 23% to 29%, so that the glass has an illuminating wavelength of C, from 498 to 525 nanometers (nm) and a hue purity of 2% to 4%.

In order to obtain the latter, U.S. Pat. No. 5,112,778 also to Cheng, indicates that the redox reaction is balanced between the ferric and ferrous oxides, the cerium oxide and the coal in a soda-lime-silica glass, changes to a state of a greater reduction when the content of total iron is increased up to a 0.05% to a 0.8%, The reason for which the ferrous value increases instead of decrease, a situation that was expected. Consequently, in order to change the reduction state so as to obtain the same ferrous value found in the lesser concentration of the total iron, the quantity of coal added to the smelting furnace, which has a total content of iron, must be diminished, a statement which is contrary to the teaching of the prior art, i.e. it will require less coal for a high content of total iron in the formulation of the soda-lime-silica glass.

The main disadvantage of the glasses described in the Cheng patents, is that, as has already been mentioned, they necessarily include the $CeO_2$ as an agent to control the reduction for the formulation, mainly the $Fe_2O_3$.

Finally, another known ingredient present in the soda-lime-silica glass is sulfuric trioxide ($SO_3$). Sodium sulfate ($Na_2SO_4$) is added to the mixtures of the glass as a refining agent at a high temperature, which is used principally as an agent for bubble elimination, and promotes mass transport, attacks free silica at the surface of the glass and lessens the number of solid inclusions.

On the other hand, the sodium sulfate has oxidizing properties, which is the reason why normally small amounts of carbon are added to the mixture, in order to prevent oxidation and at the same time lower the temperature of reaction.

During the manufacture of the glass, the $Na_2SO_4$, which is the main contributor of sulfur in the glass, converts into $SO_3$, which controls the conversion of the $Fe_2O_3$ into FeO. However, the $SO_3$ present in the final glass, does not affect the ability of the glass to transmit visible light.

The amount of $SO_3$ dissolved in the glass decreases if it has:

1. A lesser quantity (proportion-wise) of the sodium sulfate.
2. Greater smelting properties
3. Greater smelting times.
4. A furnace environment that has greater oxidation action.
5. Greater reduction of the iron to ferrous oxide (greater $Fe^{+2}$; lesser $Fe^{+3}$) arriving at a minimum of 70–75% of the $Fe^{+2}$.

Therefore, the quantity and effects of the $SO_3$ in the glass charge has to be balanced in accordance with the amount of carbon present in the charge.

Furthermore, it is a common knowledge that $SO_3$ in the glass charge must to be within certain critical quantities because lesser amounts of $SO_3$ in the glass charge will affect the refining properties, i.e. the ability to eliminate bubbles in the smelting furnace.

It is upon these bases, that the U.S. Pat. No. 5,214,008 to Beckwith and U.S. Pat. 5,240,866 to Gulotta who claim, respectively, a green glass having the property of ultra-violet radiation absorbence, which contains 0.7% to 0.95% of total iron, approximately 0.19% to 0.24% of FeO and approximately 0.20 to 0.25% of $SO_3$ (in the absence of $CeO_2$), and a green glass of ultra-violet radiation absorbence with a total iron content greater than 0.85%, a content of $CeO_2$ less than 0.5%, and a relation to the FeO/total iron of less than 0.275%.

In both the Beckwith and Gulotta patents, the FeO present in relation to the total $FeO/Fe_2O_3$, is found to be ferrous and is not transformed to the ferric type, as is done by the inventors of the present invention.

In order to convert the FeO to ferrous oxide, expressed as ferric, it is necessary to multiply the same by the factor of 1.111358.

Furthermore, in order to express the visible light transmission characteristics of a glass, it is necessary to take into account the following three main points:

1. The thickness at which it is measured, since the transission of UV, visible light and Infra-red decline in direct relation with the increase of the thickness of the glass.
2. The wavelengths of the different zones, for example the UV transmission is considered to be from 300 to 400 nm (General Motors); from 300 to the half the value of 400 nm (Ford), since the other half is transferred to the visible light; from 300 to 390 nm (PPG's U.S. Pat. No. 5,240,866); from 282.5 to 377.5 nm in ISO; as well as if the increments were from 2.5, 5 or 10 nm.

Consequently, there will be different values when measuring the ultra-violet transmission for the same product.

3. The norm utilized in respect to the solar energy, should be established beforehand, for example: "CIE PUBL:" 40; and the air mass, Perry & Moon Air Mass=to 1, Air Mass=0.2, etc.

It should be mentioned that the addition of $Na_2SO_4$ as a source of $SO_3$ in the glass, is already well known, and that some U.S. patents such as U.S. Pat. Nos. 2,755,212, and 4,792,536 already mention to content of $SO_3$ in quantities of 0.29% and 0.02%, respectively, the range of $SO_3$ as been between 0.20% and 0.25% in the glass of the U.S. Pat. No. 5,214,008 is considered critical and is a limitation on the scope of that patent.

However, contrarily to the expected by the persons having knowledge in the field, the inventors of the present invention found, surprisingly, that for a content of 0.89% to 0.91% of total iron expressed as $Fe_2O_3$; 23.5% to 26% of $Fe^{+2}$; 0.202% to 0.228% of FeO, expressed as $Fe_2O_3$; a critical content of 0.15% to 0.18% of $SO_3$, which is lesser that the commonly expected in the field and which does not affects the refining properties and ability of the $SO_3$ to eliminate bubbles, and in the absence of $CeO_2$, produces a green glass having a visible light transmission greater than 70%, an ultra-violet radiation transmission greater that 38% and less than 40%, an infra-red radiation transmission greater than 21% and less than 26.5% and a total solar transmission greater than 41% and less than 47%.

SUMMARY OF INVENTION

It is therefore the main object of the present invention to provide of a clear green lime glass, which is high in iron, and which has a visible light transmission that is greater than 70%, an ultra-violet radiation transmission greater that 38% and less than 40%, an infra-red radiation transmission greater than 21% and less than 26.5% and a total solar transmission greater than 41% and less than 47%.

Similarly another a main object of the present invention is the providing of a clear green lime glass, of the previously mentioned nature, that does not contain cerium oxide, and which has a content of 0.89% to 0.91% of total iron expressed as $Fe_2O_3$; 23.5% to 26% of $Fe^{+2}$; 0.202% to 0.228% of FeO, expressed as $Fe_2O_3$; and a critical content of 0.15% to 0.18% of $SO_3$, which does not affects the refining properties and ability of the $SO_3$ to eliminate bubbles.

In addition, still another main object of the present invention is the providing a clear green lime glass, of the previously mentioned nature, whose production is more economical due to the absence of cerium oxide and to its critical low content of $SO_3$, maintaining its desirable properties of transmission of visible light and of the absorption of infra-red and ultra-violet radiation.

These and other objects and advantages of the green thermo-absorbent glass, of the present invention will become evident to persons who have knowledge in the field, from the following detailed description of the invention, in relation to a specific embodiment.

DETAILED DESCRIPTION OF THE INVENTION

The invention will now be described in relation to a specific embodiment wherein the amounts of the main components which are critical for obtaining a green thermo-absorbent glass with the desired properties of visibility transmission and the absorption of infra-red and ultra-violet radiation are set forth.

The glass manufactured in the plant of Vitro Flotado, S. A. de C. V., named Tintex Plus, started from a composition of soda-lime-silica glass having the following analysis:

| | |
|---|---|
| $SiO_2$ | 70–75% |
| $Al_2O_3$ | 0–4% |
| CaO | 5–10% |
| MgO | 0–5% |
| $Na_2O$ | 10–15% |

And where the oxides and reduction states are the following:

| | X | R |
|---|---|---|
| TOTAL IRON | 0.899% | (0.875–0.910) |
| $SO_3$ | 0.1746% | (0.16–019) |
| $Fe^{+2}$ | 24.427% | (24.10–24.73) |
| FeO | 0.2172% | (0.2111–0.2223) |

The following are specific examples of soda-lime-silica compositions in accordance with the present invention, having corresponding physical properties of visible, ultra-violet and infrared radiation transmittances, for a glass having a thickness of 3.9 mm.

The light transmittance was evaluated in the range of 380 to 780 nρ with intervals of 10 nρ, the calculation is carried out making a numeric integration of the transmittance and taking pondered values of the function y(λ) of the illuminant "a" with observer of 1931 (2°), in accordance to the publication 15.2 of the CIE "COMMISSION INTERNATIONALE DE L' ÉCLAIRAGE" OF 1986 (Weighted factors).

The Ultraviolet radiation transmittance is evaluated in the range of 300 to 400 nρ with intervals of 10 nρ.

The Infrared radiation transmittance is evaluated in the range of 800 to 200 nρ with intervals of 50 nρ.

The Total Solar Heat Transmittance is evaluated in the range of 300 to 2000 nρ with intervals of 50 nρ.

The former three transmittances are calculated in base to a pondered numeric integration taking the transmittance in the defined wave lengths and taking as a basis the standard of Perry Moon "PROPOSED STANDARD SOLAR RADIATION CURVES FOR ENGINEERING USE" Frankling Institute, Vol. 230. Page 604, Table II (1940).

| | 1 | 2 | 3 | 4 | 5 | 6 | 7 |
|---|---|---|---|---|---|---|---|
| TSUV (%) | 38.1 | 38.6 | 39.0 | 39.4 | 39.9 | 38.4 | 39.4 |
| TSIR (%) | 23.0 | 21.2 | 26.1 | 24.9 | 24.0 | 21.9 | 23.3 |
| TSET (%) | 43.7 | 41.8 | 46.7 | 45.6 | 44.7 | 42.5 | 44.0 |
| LTA (%) | 71.0 | 70.9 | 71.9 | 71.8 | 72.0 | 71.0 | 71.7 |
| $F_2O_3$ (TOTAL) | 0.905 | 0.908 | 0.870 | 0.869 | 0.867 | 0.907 | 0.880 |
| FeO (FERRIC) | 0.224 | 0.236 | 0.205 | 0.211 | 0.217 | 0.231 | 0.222 |
| $Fe_2O_3$ (FERRIC) | 0.681 | 0.672 | 0.665 | 0.658 | 0.650 | 0.676 | 0.658 |
| % REDUCTION | 24.75 | 26.00 | 23.56 | 24.30 | 25.02 | 25.47 | 25.22 |

Consequently, the basic difference between the green thermo-absorbent glass of the present invention and those of the prior art, resides mainly in the critical content of $SO_3$, which is lower than those of the prior art, and which, contrary to the expectation, maintains the refining properties and ability of the $SO_3$ to eliminate bubbles in glass charge and provides desired optical characteristics to the glass.

We claim:

1. Green thermo-absorbent glass which includes a basic composition of lime glass, which consists essentially, by weight, of: 0.86 to 0.91% of total iron expressed as $Fe_2O_3$; 23.5 to 26% of $Fe^{+2}$ and 0.202 to 0.237% of FeO, expressed as $Fe_2O_3$; a critical amount of 0.15 to 0.18% of $SO_3$ which does not affect the refining properties and ability of the $SO_3$ to eliminate bubbles; and in the absence of $CeO_2$; the green glass having a visible light transmission greater than 70%, an ultra-violet radiation transmission greater than 38% and less than 40%, an infrared radiation transmission greater than 21% and less than 26.5%, and a total solar transmission greater than 41 and less than 47%.

2. A green thermo-absorbent glass which includes a basic composition of lime glass, and which consists essentially by weight of: 0.889% of total iron, expressed as $Fe_2O_3$; 0.17% of $SO_3$; 24.427% of $Fe^{+2}$ and 0.2172% of FeO, and in the absence of $CeO_2$.

3. A green thermo-absorbent glass, in accordance with claim 1 wherein the basic composition of lime glass includes: 70–75% of $SiO_2$; 0–4% of $Al_2O_3$; 5–10% of CaO; 0–5% of MgO; 0–15% of $Na_2O$; and 0–3% of $K_2O$.

* * * * *